W. A. Wood.
Harvester Rake.

No. 30018 — Patented Sep. 11, 1860.

Witnesses
Thos. H. Uppermann
E. Cohen

W. A. Wood
per atty
A. B. Stoughton

UNITED STATES PATENT OFFICE.

W. A. WOOD, OF HOOSICK FALLS, NEW YORK.

IMPROVEMENT IN RAKING APPARATUS FOR HARVESTERS.

Specification forming part of Letters Patent No. 30,018, dated September 11, 1860.

*To all whom it may concern:*

Be it known that I, W. A WOOD, of Hoosick Falls, in the county of Rensselaer and State of New York, have invented certain new and useful Improvements in a Raking Apparatus for Harvesting-Machines; and I do hereby declare the following to be a full, clear, and exact description of the construction and operation of the same, reference being had to the accompanying drawings, making a part of this specification, in which—

Figure 2:
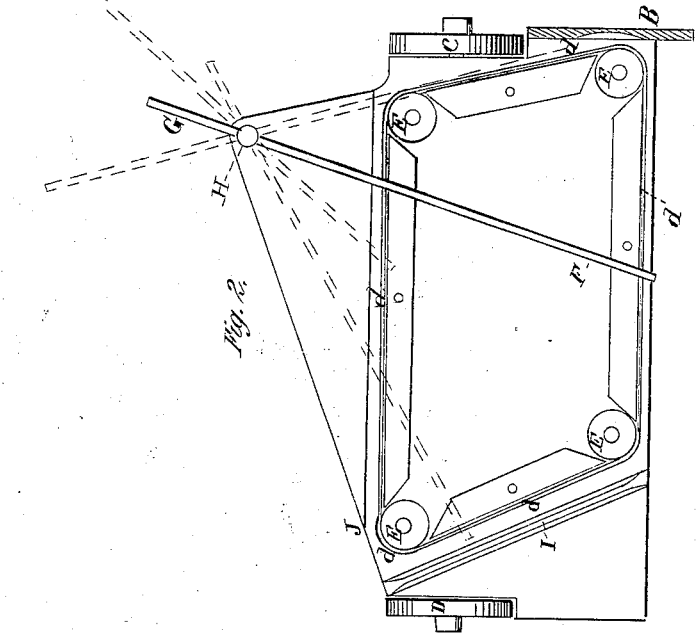
Figure 1:
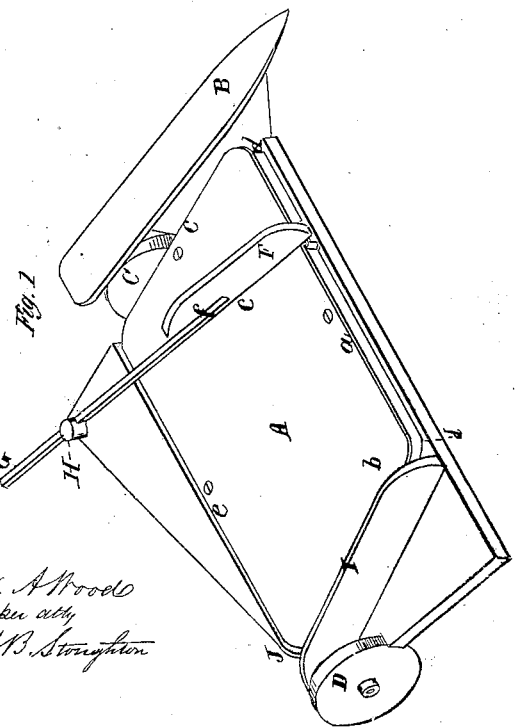

Figure 1 represents in perspective so much of the platform or grain-table of a harvesting-machine as will illustrate my invention. Fig. 2 represents a top plan of the same, with the floor of the platform removed to show the mechanism underneath or otherwise concealed by it.

Similar letters of reference, where they occur in the separate figures, denote like parts of the apparatus in both of the drawings.

I am aware that a rake has been connected to a traveling belt so that it will move around or over the platform to clear it of the cut grain; but this I do not claim independent of the peculiar manner in which my rake effects that object.

My invention consists in a rake or clearing sweep that is pivoted at one of its ends to a traveling belt that margins the platform on three of its sides, and connected at its other end to a swiveling guide, so that while the wing, teeth, or sweep of the rake may sweep off the platform and turn the straw so as to lay the heads and the gavel onto the ground at right angles, or nearly so, to the path of the machine, the rake-shank may slide through and turn with its swiveling guide, as will be explained.

To enable others skilled in the art to make and use my invention, I will proceed to describe the same with reference to the drawings.

A represents the floor of a grain-table or platform, which may be connected to the main frame of the machine in any of the usual known ways. This floor is slightly raised above the platform, so as to admit of the arranging of the pulleys and belt underneath it to prevent the cut material from being entangled therein.

B is the outside divider that separates the grain to be cut from that which is to be left standing; and C is the outside supporting-wheel, the arrangement, as shown, being that known as applied to a left-hand machine, but of course may be used with a platform arranged on the right-hand side of the main frame.

D represents a supporting or driving wheel, or both, arranged on or next to the frame of the machine, though this wheel may be dispensed with and the main wheels of the main frame effect its object.

At the front *a* and sides *b c* of the grain-table are ways in which a band or belt, *d*, of any suitable flexible material, may travel and be protected by the overhanging of the floor A. At the rear of the grain-table is another way, *e*, which, instead of following the rear margin of said table, may be parallel with the front *a*, so that the path of the belt may form a quadrilateral figure, the sides of which are parallel, or nearly so, but rounded at the corners, as shown by the drawings. The belt could of course travel around the entire margins of the platform, which is represented as of a trapezoidal-shape; but this would cause not only a longer belt and an increased distance for the rake to travel over, but also an increased length of shank to the rake, without accomplishing any beneficial purpose that the present arrangement does not afford. At the corners of the ways are arranged pulleys or friction-wheels E, around which the endless belt *d* moves, and by which it is guided. Motion is communicated to one of these friction wheels or pulleys E from any of the moving parts of the machine either by belt, crank, or cogged gearing, and the driving of that pulley puts the belt in motion around the others.

The rake F may be made of a light board or of a frame covered with cloth or wire-gauze, and may have teeth on its lower edge, though it operates well without them. The shank G extends rearward, and is made square or many-sided to keep its sweeping-board in a vertical position, and passes through a many-sided mortise in a swiveling guide, H, arranged at or near the rear of the platform. A slot, *f*, is made between the rake and the shank so that the rake may come well back over the guide-piece H, the object being to allow the rake-shank G to be as short as possible, and yet have its supporting-piece H at such distance as will allow it to travel around the path with the belt without cramping or binding.

The point of the rake or sweeping-board is pivoted to the belt d, as seen at i, Fig. 1, and its shank passes through the mortise in the swiveling block or post H; but any other swivel may be used that will support the shank properly and allow it to reciprocate through or past it—as, for instance, a pin and long slot in the shank, or a ball and socket—though the turning block or post I have shown is simple, cheap, and effective for the object. The red, dotted, blue, and black lines in Fig. 2 show several of the positions relatively of the point and shank of the rake with regard to the swiveling guide H, as the rake travels with the belt to sweep, turn, and deliver the gavel onto the ground.

The operation of the rake is as follows: Motion being communicated to the belt d, the point of the rake connected to it travels around in the exact path of said belt, while its shank turns around a fixed point—viz., the center of the block or guide H, though at the same time sliding on or through said guide. The rake sweeps off the platform and gradually turns the butts of the straw around until they come against the fence I. Here the rake turns, and, sweeping the grain along against the fence I, continues to turn it still further around until it arrives at the delivery-point J, where the gavel thus gathered and turned around is dropped upon the ground in a compact form, while the rake continues around that part of the path of the belt marked e e to perform another similar operation.

Having thus fully described the nature and object of my invention, I would state that I am aware an endless belt traveling around or under the platform has been used, and that a swiveling guide for a rake-shank has been used. I do not therefore in this application claim these things separately; but

What I do claim as new, and desire to secure by Letters Patent, is—

In combination with an automatic rake, a traveling belt for carrying the front and a turning guide for directing the shank of the rake, when the belt moves with the rake horizontally over the platform, substantially as herein described.

W. A. WOOD.

Witnesses:
 LEN. KING,
 BENJAMIN LYON.